United States Patent [19]

Jamet

[11] Patent Number: 5,671,312
[45] Date of Patent: Sep. 23, 1997

[54] CABLE HAVING FINE CONDUCTORS, IN PARTICULAR OPTICAL FIBERS, AND A METHOD AND APPARATUS FOR MAKING A CABLE HAVING FINE CONDUCTORS

[75] Inventor: Patrick Jamet, Marolles Sur Seine, France

[73] Assignee: Societe Industrielle de Liaisons Electriques, Paris, France

[21] Appl. No.: 569,091

[22] PCT Filed: Jun. 1, 1994

[86] PCT No.: PCT/FR94/00641

§ 371 Date: Dec. 4, 1995

§ 102(e) Date: Dec. 4, 1995

[87] PCT Pub. No.: WO94/29759

PCT Pub. Date: Dec. 22, 1994

[30] Foreign Application Priority Data

Jun. 8, 1993 [FR] France .................. 93 06847

[51] Int. Cl.⁶ .................................................. G02B 6/44
[52] U.S. Cl. .................. 385/100; 264/1.28; 385/112
[58] Field of Search .................. 385/100, 106, 385/109–113; 264/1.28; 425/90, 94, 102, 104

[56] References Cited

U.S. PATENT DOCUMENTS

| | | | |
|---|---|---|---|
| 4,370,023 | 1/1983 | Lange et al. | 385/111 |
| 4,464,013 | 8/1984 | Sabia | 385/109 |
| 4,840,454 | 6/1989 | Mayr | 385/109 |
| 5,155,789 | 10/1992 | Le Noane et al. | 385/106 |
| 5,224,192 | 6/1993 | Wagman | 385/112 |
| 5,276,757 | 1/1994 | Levy et al. | 385/109 |

FOREIGN PATENT DOCUMENTS

| | | |
|---|---|---|
| 0256248 | 2/1988 | European Pat. Off. . |
| 0258839 | 3/1988 | European Pat. Off. . |
| 2665266 | 1/1992 | France . |
| 2730555 | 1/1978 | Germany . |
| 2179469 | 3/1987 | United Kingdom . |

Primary Examiner—John D. Lee
Attorney, Agent, or Firm—Griffin, Butler, Whisenhunt & Kurtossy

[57] ABSTRACT

The cable comprises at least one module (3) of fine conductors (1) each covered in a primary sheath (2), the conductors being wrapped in a supporting sheath (4) that provides mechanical coupling between the fine conductors (1), and the fine conductors (1) being coated in an oil (5) having viscosity lying in the range 100 cPo to 5,000 cPo.

7 Claims, 1 Drawing Sheet

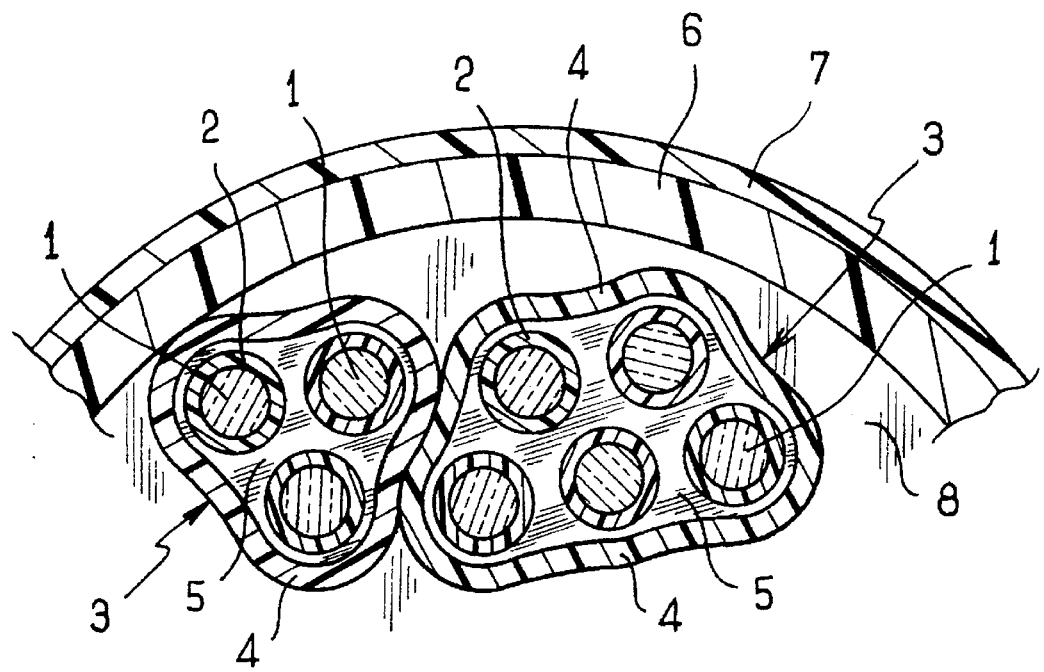
FIG_1
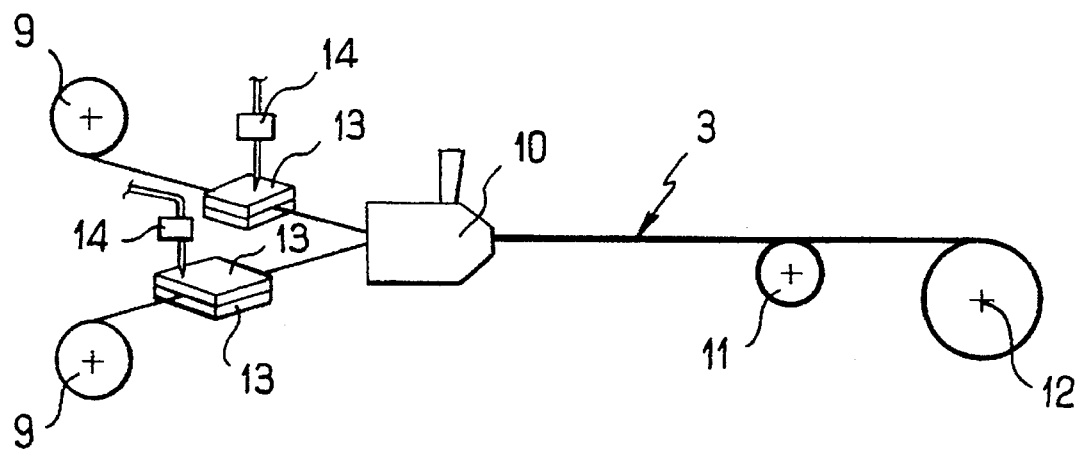
FIG_2

CABLE HAVING FINE CONDUCTORS, IN PARTICULAR OPTICAL FIBERS, AND A METHOD AND APPARATUS FOR MAKING A CABLE HAVING FINE CONDUCTORS

The present invention relates to a cable having fine conductors, in particular optical fibers, and also to a method and to apparatus for making a cable having fine conductors.

BACKGROUND OF THE INVENTION

Document FR-A-2 665 266 discloses an optical fiber cable comprising a series of optical fiber modules, each optical fiber module being enclosed in a supporting sheath that is disposed in contact with the optical fibers so as to surround them in such a manner as to achieve mechanical coupling between the fibers. Such a cable is particularly compact, but it nevertheless leaves interstices between the zones of contact between the optical fibers and those between the fibers and the supporting sheaths, and as a result the cables are not leakproof longitudinally, i.e. if an end of a cable of the above type is immersed in water, then water penetrates progressively along the inside of the cable with all the drawbacks that that can cause. The same applies to a cable having fine electrical conductors, e.g. each having a diameter of less than 0.5 mm and each covered in a primary sheath, with conductors being grouped together in one or more modules each enclosed in its own supporting sheath.

It is also known that to make a cable that is leakproof longitudinally, it is conventional to place grease between the insulated conductors, which grease is chemically inert relative to the primary sheaths of the conductors and that has viscosity that is sufficiently high to oppose penetration by water. In particular, it is common to use silicone greases having viscosity of 200,000 cPo. Such greases are highly satisfactory from the point of view of longitudinal sealing, but when an end of the cable is to be stripped for connection to equipment or to another cable, it becomes necessary to eliminate the grease. Grease elimination can be achieved by using a solvent, but that gives rise to manipulations during which the fine conductors such as optical fibers run the risk of being damaged.

SUMMARY OF THE INVENTION

According to the invention, the fine conductors of a cable of the type described in document FR-A-2 665 266 are coated in an oil having viscosity lying in the range 100 cPo to 5,000 cPo, and preferably in the range 1,000 cPo to 4,000 cPo.

Thus, unexpectedly, an oil of this type having viscosity that is much less than that of the greases normally used does not run out from the end of a cable when the cable is cut, and as a result it provides longitudinal sealing for the cable even though it can be eliminated when stripping the end of the cable merely by wiping the fine conductors with absorbent paper, thus considerably facilitating the operations of making a connection to a cable of the invention.

In another aspect, the invention relates to a method and to apparatus for making a fine conductor cable obtained by extruding a supporting sheath around a group of fine conductors, each of which is covered in a primary sheath, the fine Conductors being coated in an oil of viscosity lying in the range 100 cPo to 5,000 cPo, and preferably in the range 1,000 cPo to 4,000 cPo, by means of an applicator member such as a felt pad associated with an oil feed member and located upstream from the extrusion head.

BRIEF DESCRIPTION OF THE DRAWINGS

Other characteristics and advantages of the invention appear further from reading the following description of a particular and non-limiting embodiment of the invention described with reference to the accompanying drawing, in which:

FIG. 1 is a fragmentary section view on a greatly enlarged scale through an optical fiber cable of the invention; and FIG. 2 is a diagram of a device for making an optical fiber cable of the invention.

DESCRIPTION OF PREFERRED EMBODIMENTS

With reference to FIG. 1, the cable of the invention comprises, in a manner known per se in particular from document FR-A-2 665 266, a series of fine conductors, e.g. optical fibers 1, each of which fibers is covered in a primary sheath 2. The optical fibers 1 are collected together in modules 3 that may contain some variable number of optical fibers. Each module 3 is itself wrapped in a thin supporting sheath 4 that is easily tearable and that is intended to keep the optical fibers 1 in contact with one another so as to provide mechanical coupling between them.

According to the invention, the optical fibers 1 covered in their primary sheaths 2 are coated in an oil 5 of viscosity lying in the range 100 cPo to 5,000 cPo, and preferably in the range 1,000 cPo to 4,000 cPo. Naturally, the oil must be inert relative to the primary sheaths of the optical fibers 1, and its viscosity should preferably vary little as a function of temperature. A silicone oil having a viscosity of 1,000 cPo is particularly well adapted to implementing the invention.

It will be observed that FIG. 1 is drawn on a greatly enlarged scale, such that what appears as a relatively large space between the optical fibers is in fact a space of very small size in which the oil is held not only because of its viscosity, but also by capillarity. Capillary forces associated with viscosity also provide mechanical coupling between the optical fibers so that, as before, a particularly compact optical fiber cable is provided that nevertheless provides very good traction strength.

Also, the optical fiber cable includes in a manner known per se, a covering that is advantageously constituted by a preferably extruded layer 6 of material having a low coefficient of expansion, having low relaxation effects, and high mechanical strength due to a high modulus of elasticity, in turn covered by a second layer 7 whose function is to provide the final appearance of the cable, its resistance to abrasion, and to reduce its coefficient of friction so as to minimize the forces deployed while the cable is being laid in a tubular conduit.

In order to provide longitudinal sealing of the cable itself, the gaps 8 between the modules are preferably filled in a manner known per se with powder or with string that swells and that is easily disposed of by simple handling when stripping the cable.

FIG. 2 is a diagram showing both the method of the invention and the apparatus for implementing the method.

In conventional manner, the apparatus comprises spools 9 on which optical fibers 1 covered in their primary sheath 2 are wound. To make a module 3, an appropriate number of optical fibers are paid out from the spools 9 and the optical fibers paid out in this way are inserted simultaneously into an extrusion head 10 for making the supporting sheath 4. On leaving the extrusion head 10, the module 3 is driven by a puller member, e.g. a capstan 11, and is then wound onto a takeup spool 12 or conveyed directly to a station for making up a cable from a plurality of modules coming from respective module-making stations.

According to the invention, each optical fiber is coated in oil having viscosity lying in the range 100 cPo to 5,000 cPo prior to the fibers being inserted in the extrusion head 10 by causing the optical fibers to pass through an oil applicator member, e.g. comprising felt pads 13 in contact with the fibers and appropriately saturated in oil by a feeder device 14 such as a drip feed device approximately connected to an oil tank.

Naturally, the invention can be embodied in various ways that will appear to the person skilled in the art and without going beyond the ambit of the invention as defined by the claims. In particular, although FIG. 2 shows an oil applicator member 13 for each optical fiber, it is possible to provide a common applicator member for a plurality of optical fibers, which applicator member is preferably adjacent to the extruder head and disposed to collect excess oil that would otherwise be caused to flow back towards the upstream orifice of the extruder head during application of the supporting sheath 4. Provision may also be made to coat the optical fibers in oil by means of a calibrated die appropriately disposed in an enclosure filled with oil and located upstream from the extruder head 10. In this respect, it may be observed that coating the optical fibers presents the advantage of lubricating the extruder tooling and of preventing coloring ink being deposited on the optical fibers in the extrusion tooling, thus making it possible to make great lengths of module without incident and to use extrusion tooling that is smaller and better adapted to the size of the modules, thereby stretching the material of the supporting sheath to a lesser extent, thus minimizing phenomena associated with shrinkage of the sheath, and enlarging the temperature range over which the resulting module can operate.

Although the invention has been described with reference to an optical fiber cable, it is equally applicable to a cable having electrical conductors that are very fine, e.g. having a diameter of less than 0.5 mm with each wire being individually insulated by a very fine primary sheath and with the wires being collected together in modules so that the oil can fill the interstices between the conductors and be held therein by capillarity.

I claim:

1. In a cable having a plurality of fine conductors with a primary sheath directly contacting and covering each conductor, at least one module having a plurality of the primary sheath covered conductors disposed within a supporting sheath, and gaps between the primary sheath covered conductors in the module are substantially filled with a sealant, the improvement wherein the sealant consists essentially of an oil having a viscosity in the range of 100 cPo to 5,000 cPo.

2. A cable according to claim 1, wherein the viscosity of the oil lies in the range of 1,000 cPo to 4,000 cPo and the conductor is an optical fiber.

3. A method of making the cable of claim 1, comprising:
   1) coating the primary sheath of each covered conductor with a sealant consisting essentially of an oil having a viscosity in the range of 100 cPo to 5,000 cPo;
   2) inserting the so-coated conductors simultaneously into an extrusion head such as to cause the coated conductors to contact one another; and
   3) extruding the supporting sheath around the coated conductors such as to mechanically couple the coated conductors together and to cause the oil to substantially fill gaps between the coated conductors.

4. A method according to claim 3, wherein the viscosity of the oil lies in the range 1,000 cPo to 4,000 cPo.

5. An apparatus for making the cable of claim 1, comprising:
   1) coating means for coating the primary sheath of each covered conductor with a sealant consisting essentially of an oil having a viscosity in the range of 100 cPo to 5,000 cPo as the covered conductors are passed therethrough;
   2) an extrusion head for receiving the oil coated conductors and gathering the coated conductors such that the coated conductors contact one another; and
   3) extrusion means for extruding the supporting sheath around the coated conductors such as to mechanically couple the coated conductors together and to cause the oil to substantially fill gaps between the coated conductors.

6. Apparatus according to claim 5, wherein the viscosity of the oil lies in the range 1,000 cPo to 4,000 cPo.

7. Apparatus according to claim 5, wherein the coating means includes at least one felt pad associated with an oil feed member.

* * * * *